United States Patent [19]
Ward, Jr. et al.

[11] Patent Number: 5,802,947
[45] Date of Patent: Sep. 8, 1998

[54] DIMPLED CIRCULAR SAW BLADE

[75] Inventors: Kevin M. Ward, Jr., Louisville; Gregory A. Phillips, La Grange, both of Ky.

[73] Assignee: Credo Tool Company, Woodburn, Oreg.

[21] Appl. No.: 730,398

[22] Filed: Oct. 15, 1996

[51] Int. Cl.⁶ .................................................. B23D 47/00
[52] U.S. Cl. .............................. 83/835; 83/663; 144/218; 144/235
[58] Field of Search .............................. 83/835, 837, 848, 83/855, 663; 144/237, 236, 235, 240, 218

[56] References Cited

U.S. PATENT DOCUMENTS

| | | | |
|---|---|---|---|
| 877,146 | 1/1908 | Ward | 83/835 |
| 1,434,295 | 10/1922 | Lang | 83/855 |
| 1,861,218 | 5/1932 | Huther | 83/835 |
| 2,563,559 | 8/1951 | Sneva | 83/835 |
| 3,314,456 | 4/1967 | Craven | 83/837 |
| 3,820,419 | 6/1974 | McLagan | 76/112 X |
| 3,938,417 | 2/1976 | Nedsten | 83/835 |
| 4,027,390 | 6/1977 | Kendzior | 83/835 X |
| 4,102,230 | 7/1978 | Magnusson et al. | 83/835 |
| 4,184,526 | 1/1980 | Hanaya | 144/235 |
| 4,794,835 | 1/1989 | Fujiyoshi | 83/835 |
| 4,848,205 | 7/1989 | Suzuki et al. | 83/835 X |

FOREIGN PATENT DOCUMENTS 3738016  5/1989  Germany .................................. 83/855

*Primary Examiner*—Kenneth E. Peterson

[57] ABSTRACT

An improved circular saw blade is provided which has a plurality of dimples formed on the body of the blade by cold-working the blade. The dimples each include a circumferential ridge which extends above the surfaces of the blade's body. When a side load is applied to the work piece, the ridges contact the one of the walls defining the kerf being cut that is forced by the load against the blade, so that the surface of the blade's body is spaced from the wall. The dimples are formed by cold working the blade, which stiffens the blade, reducing the vibration of the blade during the cutting process. The dimples and their ridges also provide greater heat dissipation, and tend to provide a laminar flow of air over the surface of the blade, acting much as the dimples of a golf ball.

16 Claims, 1 Drawing Sheet

DIMPLED CIRCULAR SAW BLADE

BACKGROUND OF THE APPLICATION

This invention relates to saw blades, and in particular to dimpled saw blades for circular saws.

Many circular saw blades have flat or planar radial surfaces. These surfaces typically are in contact with the workpiece being cut, especially if the workpiece is given a side load during the cutting process. There is thus a significant amount of friction which is created when using such flat saw blades. This friction, of course, creates heat which must be dissipated. Further, because the sides of the saw blade are in contact with a workpiece which is being cut, the saw blade will vibrate or grab the workpiece, making cutting of the workpiece more difficult.

SUMMARY OF THE INVENTION

One object of the present invention is to provide an improved circular saw blade.

Another object is to provide such a saw blade in which the blade is stiffened.

Another object is to provide such a saw blade which has reduced friction with a workpiece being cut.

Another object is to provide such a saw blade in which vibration is reduced.

These and other objects will become apparent to those skilled in the art in light of the following disclosure and accompanying drawings.

In accordance with this invention, generally stated, an improved circular saw blade is provided. The saw blade has a body having a first planar radial surface, a second planar radial surface, and a circumference. A plurality of cutting teeth extend outwardly from the blade body. The intersection of the teeth with the blade body circumference defines the roots of the teeth. A mounting hole is positioned at a center of the body for mounting the blade to a spindle. The saw blade is provided with a plurality of dimples on each surface of the blade. The dimples are preferably formed by cold working the blade. The dimples each include a circumferential ridge which extends above the surface of the blade body. When a side load is applied to the workpiece during cutting, the ridges contact a wall of the kerf. The dimples preferably form an outer circle of dimples, a middle circle of dimples and an inner circle of dimples, the circles of dimples being concentric with each other and with the mounting hole. The outer circle of dimples is positioned at the root of the cutting teeth. On a standard 7½" blade, the inner circle of dimples may be spaced approximately 0.75" from the outer circle of dimples; and the middle circle of dimples is evenly spaced between the inner and outer circles of dimples. Alternatively, the ratios of the radii of the circles of dimples to the radius of the saw blade are about 0.9, 0.8, and 0.7, respectively for the outer, middle, and inner circles. Individual dimples of the inner circle and individual dimples of the outer circle are formed on common radii, and individual dimples of the middle circle are evenly spaced between adjacent dimples of the inner and outer circles. In the blade of the illustrative example, the dimples have a diameter of about 0.125" at their ridges, a ridge height of about 0.005" from the surface of the blade and a depth from the surface of the blade of on the order of 0.020" to 0.030".

DESCRIPTION OF THE PREFERRED EMBODIMENT

Figure 1:
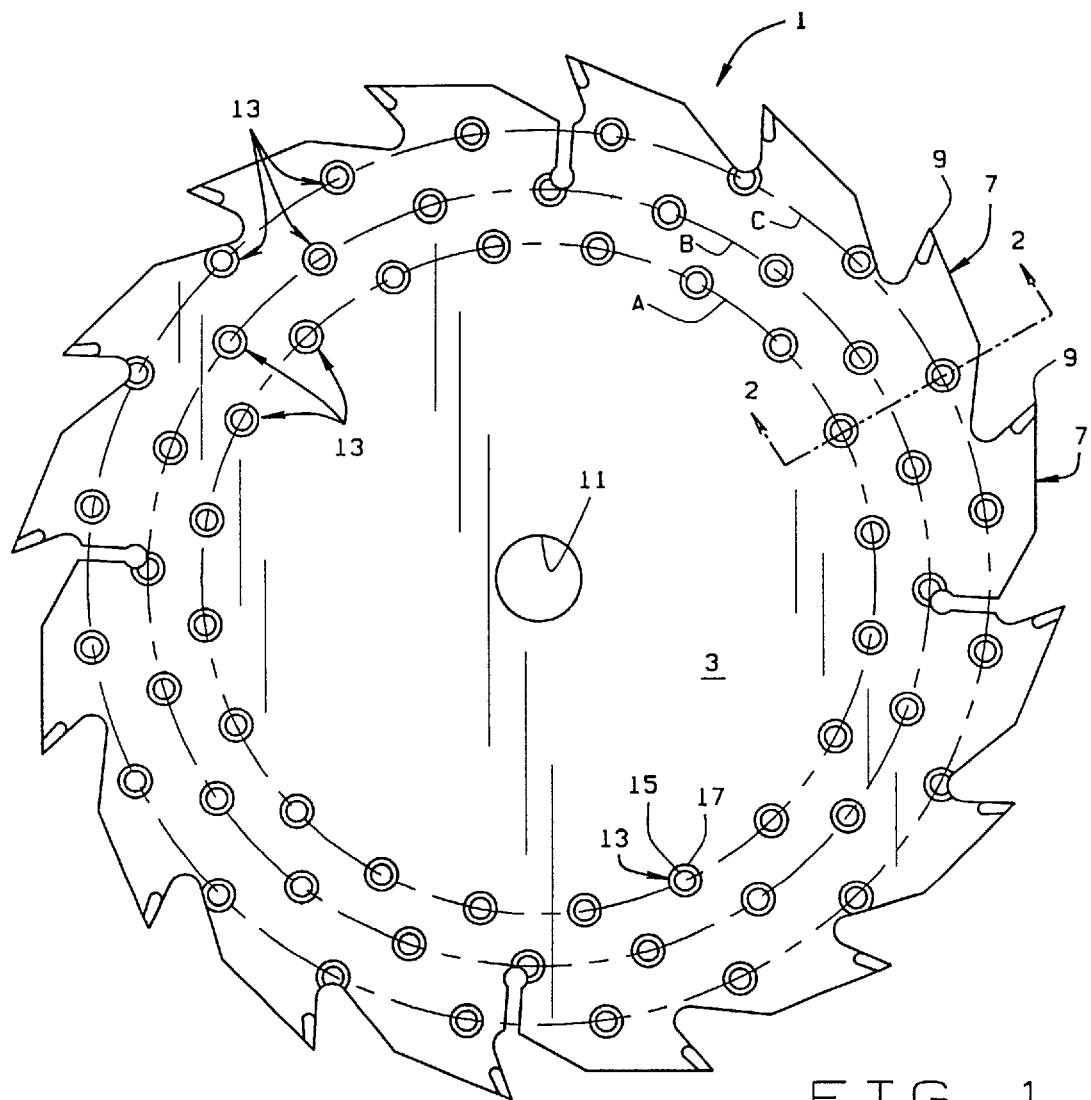
FIG. 1 is a plan view of a saw blade of the present invention.

An illustrative saw blade 1 of the present invention is shown generally in the Figures to include a body having a first planar radial surface 3, a second planar radial surface 5, and a circumference. A plurality of cutting teeth 7 extend outwardly from the circumference of the blade body. The teeth 7 include cutting tips 9 at their ends. A mounting hole 11 is formed in the center of the blade to enable the blade 1 to be mounted on a spindle, as is conventional.

As can be seen in the drawing, the surfaces 3 and 5 are provided with a plurality of dimples 13. The dimples are preferably formed in three rows A, B, and C, shown in phantom, which form or define three radially spaced apart circles concentric with the mounting hole 11. The dimples on surface 3 of the blade body are preferably coaxial with the dimples on surface 5 of the blade body. Thus, there is preferably a 1:1 correspondence for the dimples on blade surfaces 3 and 5.

The outer circle C of dimples is positioned substantially adjacent the root of the cutting teeth 7. The middle circle B is positioned to be equidistant from the outer circle C and the inner circle A. The dimples of the circles A and C are formed to be on the same radius, i.e. a line passing through the center of mounting hole 11 and the center of a dimple on circle A will also pass through the center of a dimple on circle C. The dimples on the middle circle B are offset from the dimples on circles A and C. Preferably, the dimples of circle B are approximately midway between two adjacent dimples on circles A and C. For a 7½" diameter (from cutting tip to cutting tip) blade, the dimples of each circle preferably are about 0.125" in diameter and are spaced apart by about 18° of arc. The spacing of the dimples could be changed according to the number of teeth and the diameter the blade. Circles A and C are preferably about 0.75" apart and circle B is about 0.375" from circles A and C. Circle C has a radius of about 3.125", circle B has a radius of about 2.75", and circle A has a radius of about 2.375". Stated differently, the ratio of the diameter of the circles of dimples to the diameter of the blade is about 0.89, 0.79, and 0.68, respectively for the circles C, B, and A.

Figure 2:
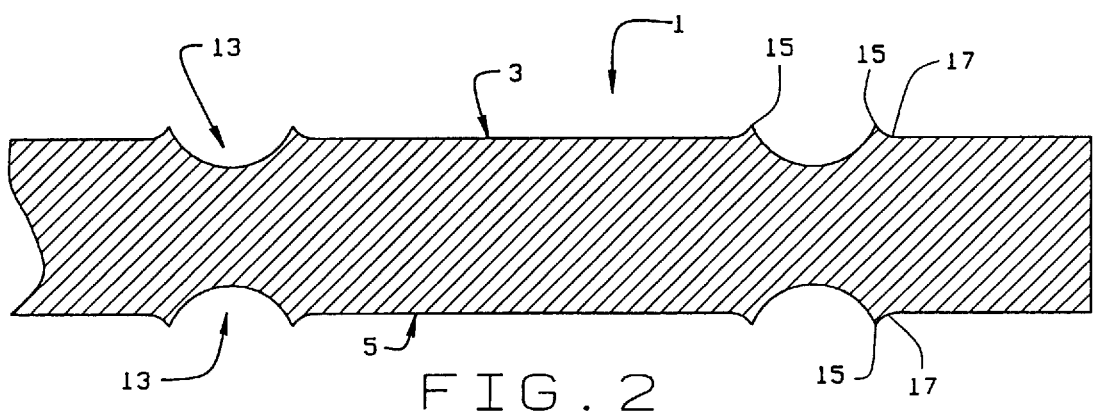
FIG. 2 is an enlarged cross-sectional view of the saw blade taken along line 2—2 of FIG. 1.

The dimples 13 are shown in more detail in FIG. 2. The dimples 13 are preferably formed by cold-working the blade, which can be made of the carbon steel of which such blades are conventionally made. During the formation of the dimples, a portion of the blade material is displaced above the surface of the blade to form ridges 15 which surround the dimples. The 0.125" diameter of the dimples is the diameter of the ridge of the dimple. The ridge 15 is surrounded by a downwardly sloped surface 17 which extends from the ridge to the surfaces 3 and 5 of the blade. In the blade of this illustrative embodiment, 120 tons of force are used to create a dimple that is preferably 0.020"–0.030" deep from the surface of the blade and a ridge that is 0.005" above the surface of the blade.

The formation of cold-worked dimples serves to stiffen the blade. The stiffer blades vibrate less during use and therefore create a better cut. Further, they require less power to run. When a side load is applied to the workpiece during the cutting process, the surfaces of the blade body tend to be spaced by the ridges from the edges of a cut formed in the wood being cut. This reduces the amount of friction and heat which would be created in the absence of the dimples. As heat causes the blade to warp, the reduced production of heat reduces the tendency of the blade to warp, and extends the useful life of the blade. The dimples also increase the surface area of the blade. The increased surface area will facilitate the dissipation of heat generated during use of the blade. The dimples also cause a more laminar flow of air over the blade (as compared to a flat blade), in the same manner as a dimpled golf ball. This reduces the noise generated when using the blade, especially when this property is combined with the increased stiffness of the blade.

As variations within the scope of the appended claims may be apparent to those skilled in the art, the foregoing description is set forth only for illustrative purposes and is not meant to be limiting. For example, although the dimples on the two surfaces of the blade are preferably coaxial, as seen in FIG. 2, the dimples of surface 5 could be offset radially or circumferentially or both from the dimples of surface 3. There could be more dimples on one of the blade surfaces than the other. The dimples of each circle need not be the same size, and circle B need not be equidistant between circles A and C. Further, the circles of dimples could be spaced farther apart or closer together. It is not essential that the dimples lie on a well-defined circle at all. The dimples can be of other shapes, as, for example, oval, polygonal, inverted conical or truncatedly conical, inverted pyramidal or truncatedly pyramidal, or even irregular. The number, spacing, pattern, size (diameter when they are round in plan) and depth of the dimples, the height of the ridges, and the force employed in forming the dimples, i.e. the amount of cold working, are all variable depending upon the diameter, axial thickness, composition and construction of the blade and teeth, but their appropriate provision will be apparent to those skilled in the art in the light of the foregoing disclosure. These examples are merely illustrative.

We claim:

1. A circular saw blade, the saw blade having a body and a plurality of cutting teeth extending outwardly from the blade body; the blade body having a first planar radial surface and a second planar radial surface, said planar surfaces extending from a central aperture in said body to said teeth, the saw blade having a multiplicity of discrete dimples formed on at least one of said radial surfaces of said blade body, the dimples each having a perimeter, and each including a ridge extending around the entire perimeter of said dimple, which extends above the planar surface of the blade body in which the dimple is formed.

2. The circular saw blade of claim 1 wherein the dimples are formed by cold working.

3. The circular saw blade of claim 1 wherein the dimples form a plurality of circles of dimples, concentric with a center of said blade, said circles having different diameters.

4. The circular saw blade of claim 3 including an outer circle of dimples and an inner circle of dimples spaced radially inwardly from the outer circle.

5. The circular saw blade of claim 4 wherein the dimples of the inner circle are offset circumferentially from the dimples of the outer circle.

6. The circular saw blade of claim 5 wherein the dimples of the inner circle are circumferentially approximately midway between adjacent dimples of the outer circle.

7. The circular saw blade of claim 4 wherein the circles of dimples further include an innermost circle of dimples spaced radially inwardly from the inner circle of dimples.

8. The circular saw blade of claim 3 wherein dimples are positioned adjacent roots of cutting teeth on the circumference of the blade.

9. The circular saw blade of claim 3 wherein dimples of the first radial surface of the blade are coaxial with dimples of the second radial surface.

10. The circular saw blade of claim 1 wherein the dimples are circular.

11. A circular saw blade, the saw blade comprising a body having a first surface, a second surface, and a circumferential edge, a plurality of cutting teeth extending radially from the blade body edge, and a multiplicity of dimples formed on each of said surfaces of said blade body, the dimples each having a perimeter and each including a ridge which extends around the entire perimeter of the dimple and above the surface of the blade body, the ridges contacting the work piece to space the blade surfaces from the edges of a cut formed in a workpiece during use of the blade when a side load is applied to said workpiece; the dimples forming at least an outer circle of dimples, a middle circle of dimples and an inner circle of dimples, the circles of dimples being concentric with each other and with the edge of the blade body.

12. The circular saw blade of claim 11 wherein individual dimples of the inner circle and individual dimples of the outer circle are formed on common radii.

13. The circular saw blade of claim 12 wherein individual dimples of the middle circle are evenly spaced between adjacent dimples of the inner and outer circles.

14. The circular saw blade of claim 11 wherein the inner circle of dimples is spaced approximately 0.75" from the outer circle of dimples.

15. The circular saw blade of claim 14 wherein the middle circle of dimples is evenly spaced between the inner and outer circles of dimples.

16. The circular saw blade of claim 11 wherein the ratios of the radii of the circles of dimples to the radius of the saw blade are about 0.9, 0.8, and 0.7, respectively for the outer, middle, and inner circles.

* * * * *